United States Patent
Bellinger

Patent Number: 6,165,102
Date of Patent: Dec. 26, 2000

[54] SYSTEM FOR CONTROLLING OUTPUT TORQUE CHARACTERISTICS OF AN INTERNAL COMBUSTION ENGINE

[75] Inventor: Steven M. Bellinger, Columbus, Ind.

[73] Assignee: Cummins Engine Company, Inc., Columbus, Ind.

[21] Appl. No.: 09/447,187

[22] Filed: Nov. 22, 1999

[51] Int. Cl.[7] .................................................. F16H 61/48
[52] U.S. Cl. ........................... 477/54; 477/168; 477/181
[58] Field of Search ............................... 477/54, 168, 181

[56] References Cited

U.S. PATENT DOCUMENTS

| | | | |
|---|---|---|---|
| 4,868,477 | 9/1989 | Anderson et al. | 318/696 |
| 4,914,597 | 4/1990 | Moncelle et al. | 364/426.04 |
| 5,157,613 | 10/1992 | Williams et al. | 364/431.08 |
| 5,165,240 | 11/1992 | Page et al. | 60/719 |
| 5,222,022 | 6/1993 | Adams et al. | 364/431.07 |
| 5,258,914 | 11/1993 | Schmitt | 364/426.03 |
| 5,274,558 | 12/1993 | High et al. | 364/431.02 |
| 5,305,213 | 4/1994 | Boardman et al. | 364/424.1 |
| 5,305,662 | 4/1994 | Togai et al. | 74/866 |
| 5,446,665 | 8/1995 | Adrian et al. | 364/431.04 |
| 5,457,633 | 10/1995 | Palmer et al. | 364/431.09 |
| 5,490,071 | 2/1996 | Akabane | 364/426.02 |

Primary Examiner—Dirk Wright
Attorney, Agent, or Firm—Baker & Daniels

[57] ABSTRACT

A system for controlling output torque characteristics of an internal combustion engine includes a control computer operable to control the output power/torque of the engine that is coupled to a transmission through a torque converter. The system is operable to determine an engine speed range of interest and limit engine output power/torque to a predefined maximum value if the current engine speed is within the engine speed range of interest when the torque converter is operating in torque converter mode (i.e., not in lockup mode). The predefined maximum value of engine output power/torque is preferably a maximum horsepower value that may be a constant value or a function of engine speed within the engine speed range of interest. Alternatively, the predefined maximum value of engine output power/torque is a dynamic function of a torque ratio of the torque converter and a predefined turbine torque limit.

33 Claims, 5 Drawing Sheets

SYSTEM FOR CONTROLLING OUTPUT TORQUE CHARACTERISTICS OF AN INTERNAL COMBUSTION ENGINE

FIELD OF THE INVENTION

The present invention relates generally to electronic control systems for internal combustion engines, and more specifically to such systems for controlling output torque characteristics of the engine.

BACKGROUND OF THE INVENTION

Known electronic systems for controlling the output torque or output power of an internal combustion engine are typically concerned with controlling regions of maximum (peak) engine output torque to thereby achieve any of a number of engine/drivetrain performance and/or engine/drivetrain operational efficiency goals. No systems are presently known, however, for controlling engine output torque or output power characteristics in engine output torque or engine output power regions remote from regions of peak engine output torque.

Figure 1:
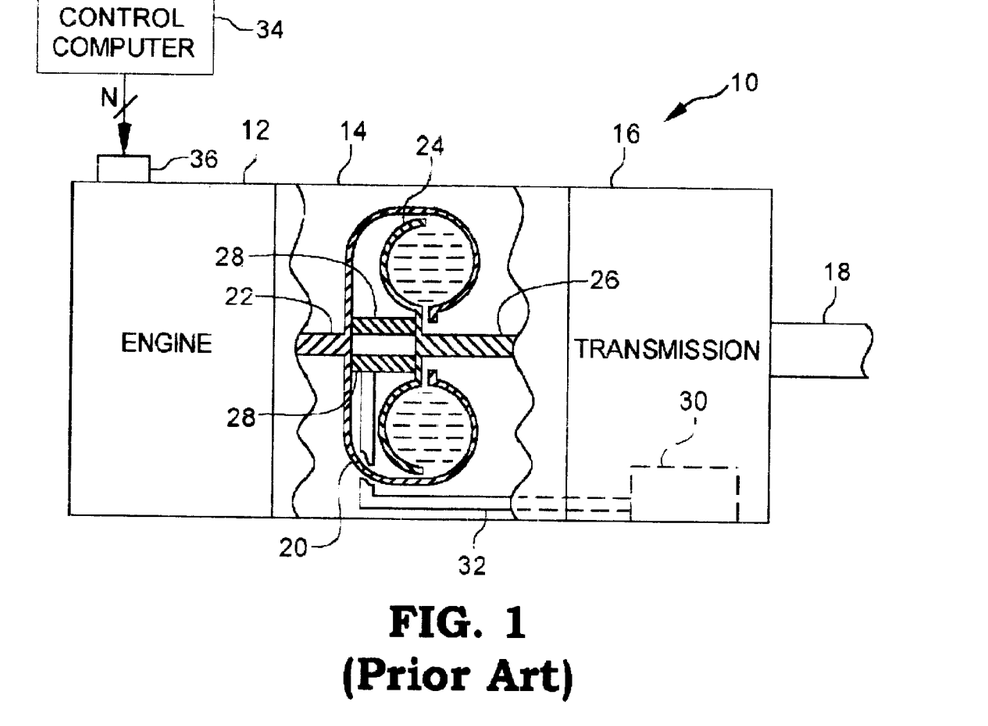
FIG. 1 is a diagrammatic illustration of a prior art engine control system including a torque converter disposed between an internal combustion engine and a transmission.

An example of a situation wherein it would be desirable to control engine output torque characteristics only in an engine output torque region remote from peak engine output torque occurs in vehicles having torque converters operating in a so-called "torque converter" mode at least part of the time. Torque converters are known and commonly used in the automotive and heavy duty truck industries to control the transfer of engine output torque to at least partially automated vehicle transmissions, and one example of a known system 10 employing such a torque converter is illustrated in FIG. 1. Referring to FIG. 1, an internal combustion engine 12 is coupled to a torque converter 14 of known construction which is itself coupled to a transmission 16 having a tailshaft or propeller shaft 18 extending therefrom. As shown in partial cutaway and partial cross-section, torque converter 14 includes an impeller or pump 20 affixed to a torque converter adaptation assembly 22 that is driven by an output shaft of the engine 12, and a turbine 24 affixed to a turbine shaft 26 of transmission 16. A lockup clutch 28 is disposed between impeller 20 and turbine 24, and is coupled to a charge pump 30 of transmission 16 via fluid passageway 32.

Transmission 16 is a known semi-automatic, automated or fully automatic transmission having a number of automatically selectable gear ratios. Propeller shaft 18 extends from transmission 16 and is operable to drive one or more vehicle wheels (not shown) as is known in the art.

System 10 includes a control computer 34 which interfaces with a number of engine operational sensors and subsystems (not shown) as is known in the art, and is connected to an engine fueling system 36 via a number N of signal paths, wherein N may be any integer. In operation, control computer 34 is operable to determine appropriate fueling signals, based on current engine operating conditions as is known in the art, and provide corresponding fueling signals to fueling system 36. Fueling system 36 is, in turn, responsive to the fueling signals provided thereto by control computer 34 to supply fuel to engine 12. Engine 12 is designed and calibrated such that it is responsive to the fuel supplied thereto via fueling system 36 to produce a characteristic engine output torque curve over a range of engine speeds as is known in the art.

Figure 2:
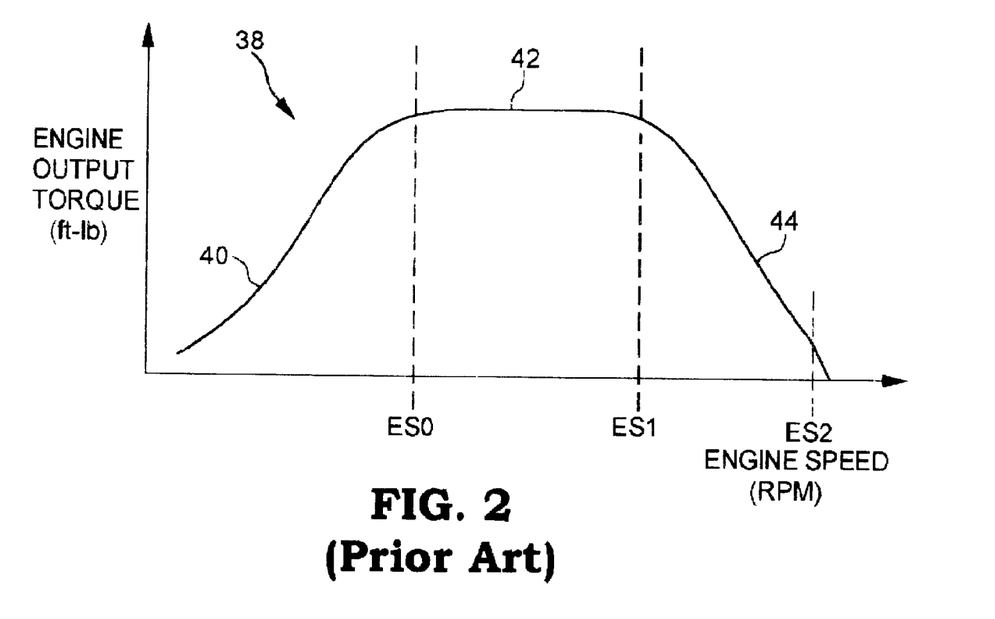
FIG. 2 is a plot of engine output torque vs. engine speed illustrating a prior art engine output torque waveform for the system of FIG. 1.

Referring to FIG. 2, one example of a known characteristic engine output torque curve 38 over a range of engine speed values is shown. Engine output torque curve 38 includes a region 40 of rising engine output torque followed by a region 42 of peak engine output torque followed by an region 44 of decreasing engine output torque, wherein regions 40, 42 and 44 sequentially correspond to increasing engine speeds. The region 42 of peak torque defined between engine speeds ES0 and ES1 is typically referred to as the "torque dwell" region, after which engine output torque decreases with increasing engine speed to a so-called "governed" engine speed ES2. The term "governed engine speed" is defined for the purposes of this document as that engine speed at which the engine 12 achieves a "rated" or advertised output power.

In the operation of system 10, the torque converter 14 is operable in a so-called "torque converter" mode during vehicle launch and low speed operations, whereby the lockup clutch 28 is disengaged and the impeller 20 therefore rotates at the speed of the engine 12 while the turbine 24 is actuated by the impeller 20 through the fluid shown disposed therebetween in FIG. 1. In this operational mode, torque multiplication occurs through the fluid coupling such that the transmission turbine shaft 26 is exposed to more input torque than is being supplied by the engine output shaft 22, as is known in the art. When the engine 12 is otherwise engaged with certain gear ratios of transmission 16, the torque converter is generally operable in a so-called "lockup" mode, whereby the lockup clutch 28 is engaged and the impeller 20 is therefore secured to the turbine 24 to thereby directly couple the torque converter adaptation assembly 22 to the turbine shaft 26, as is known in the art. The transmission 16 is operable, in a known manner, to mechanically or hydraulically control the operational status of the lockup clutch 28. As shown in FIG. 1, for example, a fluid passageway 32 couples the lockup clutch 28 to the charge pump 30 of transmission 16, whereby the charge pump 30 controls the hydraulic pressure of fluid supplied thereto to operably engage and disengage lockup clutch 28.

Transmitting torque through torque converter 14 during "torque converter" mode is known to be an inefficient transfer of engine operating power. However, the "torque converter" mode of operation is desirable, for at least short durations for example, to provide for clutch-less vehicle launches and to multiply engine output torque during vehicle launch conditions. Accordingly, manufacturers of semi-automatic, automated and/or fully automatic transmissions specify a so-called "stall turbine torque limit" that corresponds to a maximum allowable transmission input torque during a "torque converter stall" condition which is a known industry term and is defined for the purposes of this document as an operating condition wherein the vehicle wheels are locked, the transmission is in gear and the engine is operating at full/maximum or peak power. The peak engine output power (and corresponding stall turbine torque) typically occurs in region 44 of the engine output torque curve 38 of FIG. 2 (i.e. between engine speed ES1 corresponding to the high engine speed boundary of the torque dwell region and engine speed ES2 corresponding to governed engine speed).

In order to meet the so-called stall turbine torque limits specified by transmission manufacturers, designers of internal combustion engines heretofore typically selected a torque converter exhibiting optimum operational characteristics and then designed the engine output torque characteristics to yield maximum engine performance without exceeding specified input limits of the transmission during torque converter operation including, for example, a stall turbine torque limit. Unfortunately, such design strategies sometimes resulted in sacrificing vehicle performance during torque converter lockup operation. What is therefore needed is a system for controlling engine output torque in torque regions remote from the torque dwell region during torque converter mode of operation. Such a system would enable an engine designer to configure the engine output torque curve 38 so as to limit engine output torque in engine output torque region 44 during torque converter mode of operation, while providing for greater available engine output power in lockup mode of torque converter operation.

SUMMARY OF THE INTENTION

The foregoing shortcomings of the prior art are addressed by the present invention. In accordance with one aspect of the present invention, a system for controlling output torque characteristics of an internal combustion engine comprises a torque converter coupled at one end to an internal combustion engine and at an opposite end to a transmission, the torque converter operating in a lockup mode when the torque converter couples the engine directly to the transmission and otherwise operating in a torque converter mode, means for producing a first signal indicative of whether the torque converter is operating in the lockup mode or in the torque converter mode, and a control computer responsive to the first signal to limit an engine output parameter to a maximum engine output parameter value within a predefined engine speed range if the first signal indicates that the torque converter is operating in the torque converter mode.

In accordance with another aspect of the present invention, a method of controlling output characteristics of an internal combustion engine comprises the steps of determining an engine speed range of the internal combustion engine, determining whether a torque converter disposed between the internal combustion engine and a transmission is operating in one of a lockup mode and a torque converter mode, determining a current engine speed of the engine, and limiting an engine output parameter to a maximum engine output parameter value if the current engine speed falls within the engine speed range and the torque converter is operating in the torque converter mode.

One object of the present invention is to provide a system for controlling output torque characteristics of an internal combustion engine.

Another object of the present invention is to implement such a system to thereby control output torque characteristics of an internal combustion engine within one or more specified speed ranges.

Yet another object of the present invention is to provide such a system to thereby achieve desired stall turbine torque goals.

Still another object of the present invention is to provide such a system to thereby achieve desired speed ratio at governed speed goals.

These and other objects of the present invention will become more apparent from the following description of the preferred embodiment.

DESCRIPTION OF THE PREFERRED EMBODIMENT

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 3:
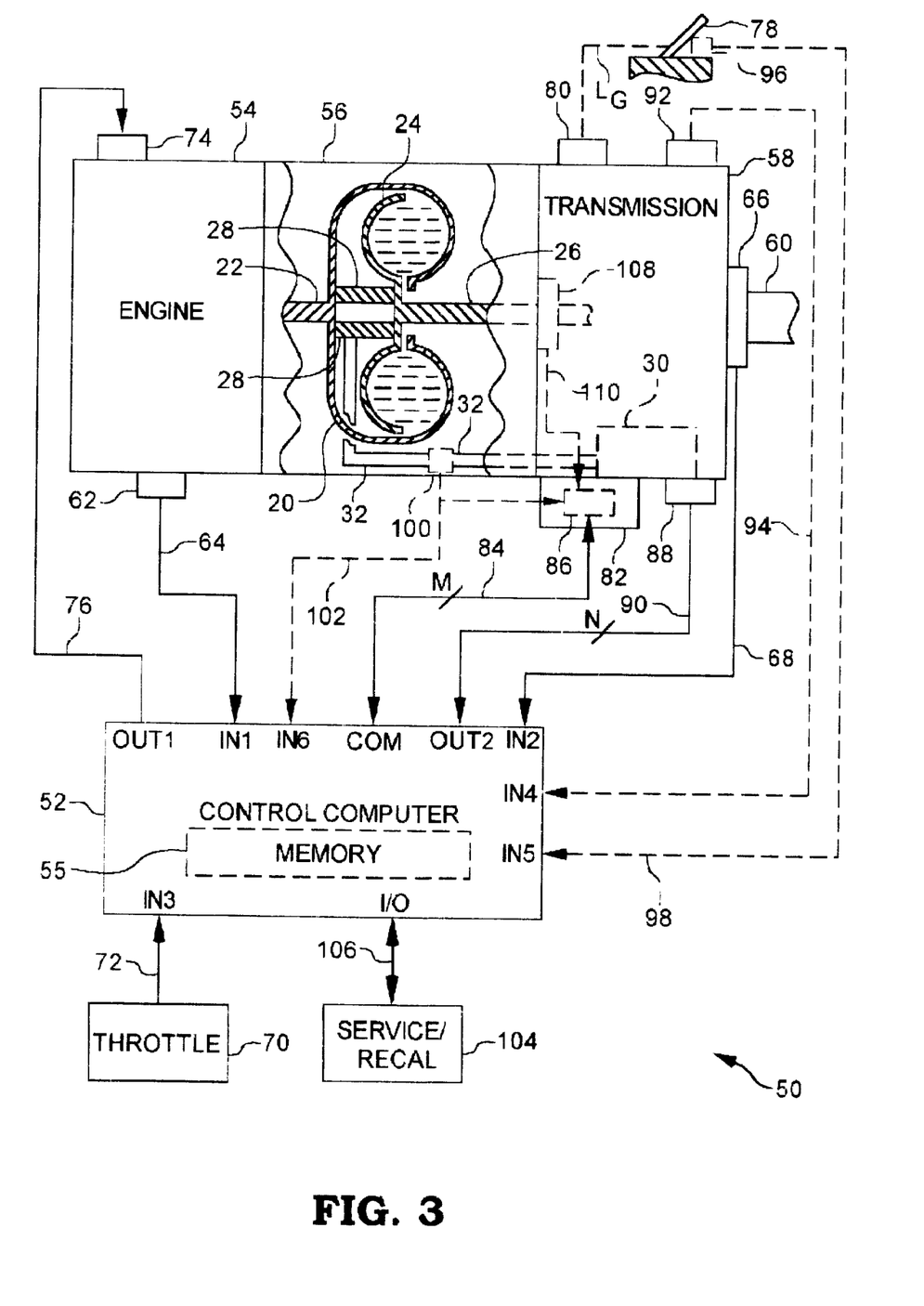
FIG. 3 is a diagrammatic illustration of one embodiment of an engine control system for controlling engine output torque characteristics in accordance with the present invention.

Referring now to FIG. 3, one embodiment of a system 50 for controlling output torque characteristics of an internal combustion engine, in accordance with the present invention, is shown. System 50 includes a control computer 52 that is preferably microprocessor-based and includes a memory portion 55. In one embodiment, control computer 52 is operable to control and manage operation of an internal combustion engine 54, and may accordingly be an engine control module (ECM), engine control unit (ECU), powertrain control module (PCM) or other known engine control computer. The memory portion 55 of control computer 52 may include ROM, RAM, EPROM, EEPROM, Flash memory and/or any other suitable memory known to those skilled in the art.

Internal combustion engine 54 is operatively coupled to a torque converter 56 which is, in turn, operatively coupled to an automated transmission 58 having a number of automatically selectable gear ratios. A propeller shaft or tailshaft 60 extends from transmission 58 and is coupled to other downstream drivetrain components (not shown) as is known in the art. As shown in partial cutaway and partial cross-section, torque converter 56 includes an impeller or pump 20 affixed to a converter adaptation assembly 22 that is driven by an output shaft of the engine 54, and a turbine 24 affixed to a turbine shaft 26 of transmission 58. A lockup clutch 28 is disposed between impeller 20 and turbine 24, and is connected to a charge pump 30 of transmission 16 via fluid passageway 32, wherein the charge pump 30 of transmission 58 is operable to engage and disengage the lockup clutch 28 to thereby cause the lockup clutch 28 to operate in lockup mode or torque converter mode respectively, as described in the BACKGROUND section. Thus far, the structure and operation of torque converter 56 is identical to that of torque converter 14 shown and described with respect to FIG. 1. Unlike torque converter 14, however, the torque converter 56 of FIG. 3 may further include a fluid pressure sensor 100, as shown in phantom in FIG. 3, wherein sensor 100 may be suitably disposed within the fluid passageway 32 or other convenient location. Fluid pressure sensor 100 is operable, in any case, to sense pressure of the fluid supplied to the torque converter 56 by the charge pump 30 and produce a pressure signal corresponding thereto on signal path 102. Such a pressure signal may be used, as will be described in greater detail hereinafter, to determine an operational status of the lockup clutch 28 and, hence, an operational mode of the torque converter 56 (i.e., lockup or torque converter). Signal path 102 may be connected to an input IN6 of control computer 52, and/or may be connected to an input of an auxiliary computer 86 associated with transmission 58.

Transmission 58 may be a fully automatic transmission having a plurality of automatically selectable gear ratios, a so-called automated transmission having at least one manually selectable gear ratio and a number of automatically selectable gear ratios, or a manual/automatic transmission having a number of manually selectable gear ratios and a number of automatically selectable gear ratios, and in any case transmission 58 will be hereinafter referred to as an automated transmission. In one embodiment, transmission 58 is a manual/automatic transmission and system 50 accordingly includes a manual gear selection lever 78 mechanically connected to a manual gear selection port 80 of transmission 58 via linkage $L_G$. In this embodiment, gear selection lever 78 may be coupled to a gear position sensor 96, as shown in phantom, wherein sensor 96 is electrically connected to input IN5 of control computer 52 via signal path 98. Sensor 96 is operable, in this case, to provide a gear position signal indicative of a currently engaged gear ratio or transmission operational status, whereby control computer 52 may be operable to determine from such a gear position signal a currently engaged gear ratio or transmission operational status. In this embodiment, system 50 further includes a shift actuator module 88 that is electrically connected to output OUT2 of control computer 52 via a number, N, of signal paths 90, wherein N may be any integer. In one preferred embodiment, transmission 58 is a so-called Top-2 transmission and module 88 preferably includes two shift solenoids that are each responsive to signals provided thereto on signal paths 90 to control automatic shifting of the top two automatically selectable gear ratios of transmission 58.

In an alternate embodiment, transmission 58 is a fully automatic transmission wherein element 78 is replaced with a shift console of known construction (e.g. having at least selectable Drive and Reverse operating positions), and elements 80, 88, 90, 96, 98 and $L_G$ are omitted from FIG. 3. In this embodiment, transmission 58 includes a transmission control module 82 including a known transmission control computer 86 electrically connected to a communications port COM of control computer 52 via signal path 84. Transmission control computer 86 and control computer 52 are operable to exchange information via signal path 84, and in one embodiment signal path 84 comprises a multiple-wire data link configured for communicating information between computers 52 and 86 in accordance with a SAE J1939 protocol. It is to be understood, however, that signal path 84 may alternatively comprise one or more wires configured for communicating information between computers 52 and 86 in accordance with any desired communications protocol. In any event, transmission control computer 86 is, in this embodiment, preferably operable to control automatic shifting of transmission gears in accordance with one or more gear shifting algorithms stored therein and based on current engine operating information provided thereto via signal path 84 as is known in the art. Alternatively, control computer 52 may be configured to control such automatic shifting.

In another alternative embodiment, transmission 58 is a so-called automated transmission having at least one manually selectable gear ratio and a number of automatically selectable gear ratios. In this embodiment, element 78 is replaced with a shift console of known construction (e.g. having at least selectable Drive and Reverse operating positions), and elements 80, 88, 90, 96, 98 and $L_G$ are omitted from FIG. 3, whereby a launch gear may be manually selected as is known in the art to launch the vehicle. Thereafter, transmission control computer 86 or control computer 52 is operable to control automatic gear shifting of transmission 58 as described hereinabove with respect to the fully automatic transmission embodiment. In this embodiment, the shift console may be equipped with an upshift selector and a downshift selector (not shown), wherein the upshift and downshift selectors are preferably depressable buttons that provide for manually upshifting or downshifting of the automatically selectable transmission gears under certain operating conditions as is known in the art.

Any of the transmission embodiments described hereinabove may additionally or alternatively include a gear position determining module 92 electrically connected to input IN4 of control computer 52 via signal path 94 as shown in phantom. Module 92 may include interface circuitry connected to microswitches or other known means within or associated with transmission 58 for determining a presently engaged gear ratio, gear position or operational status of transmission 58. Module 92 may accordingly provide control computer 52 and/or transmission control computer 86 with a signal on signal path 94 that is indicative of presently engaged gear ratio, gear position and/or transmission operational status. Any of the transmission embodiments described hereinabove that include a transmission control computer 86 or equivalent control circuitry may additionally include a transmission input speed sensor 108 electrically connected to computer 86 via signal path 110. Transmission input speed sensor 108 may be any known sensor or sensing system, such as a variable reluctance or Hall effect sensor for example, that is operable to produce a speed signal on signal path 110 indicative of rotational speed of the turbine shaft 26. Transmission control computer 86 may therefore be operable in these embodiments to determine a currently engaged gear ratio or gear ratio status as a ratio of transmission input speed, provided by sensor 108, and transmission output speed, provided by sensor 66. Transmission control computer 86 is preferably operable to receive the vehicle speed signal provided by sensor 66 via the COM port of control computer 52, wherein control computer 52 is operable to broadcast vehicle speed information onto data link 84 as is known in the art. Alternatively, transmission control computer 86 may be electrically connected directly to sensor 66 for direct receipt of the tailshaft speed information. Alternatively still, transmission 58 may include another speed signal sensor or sensing system (not shown) operable to sense transmission output (tailshaft) speed and provide such a signal to transmission control computer 86 for determination of a currently engaged gear ratio or gear ratio status as described hereinabove.

A number of other sensors and subsystems permit control computer 52 to interface with some of the various components of system 50 as well as other vehicle and engine control systems, as is known in the art. Accordingly, control computer 52 includes a number of inputs, outputs and input/output (I/O) ports for interfacing with the various sensors and subsystems. For example, a "throttle" 70 is connected to an input IN3 of control computer 52 via signal path 72 and produces a throttle signal thereon that is indicative of requested engine torque. Throttle 70 may thus represent a known accelerator pedal and accompanying sensor, a known cruise control unit and/or a known power-take-off (PTO) unit, wherein each of these various throttle elements is operable to provide control computer 52 with one or more signals indicative of driver demanded torque.

Input IN1 of control computer 52 is connected to an engine speed sensor 62 via signal path 64, wherein sensor 62 is operable to sense engine rotational speed (e.g. RPM) and produce an engine speed signal corresponding thereto. In one preferred embodiment, engine speed sensor 62 is a Hall effect sensor operable to sense passage thereby of a number of teeth forming part of a tone wheel or other rotating member and produce an analog signal indicative of engine rotational speed. Input IN1 of control computer accordingly preferably includes an analog-to-digital (A/D) converter operable to convert the analog engine speed signal to a digital signal suitable for processing by control computer 52. Alternatively, engine speed sensor 62 may be any other known sensor or sensing system operable to determine engine rotational speed and produce an analog or digital signal corresponding thereto. An example of one such alternative sensor includes, but is not limited to, a variable reluctance sensor.

Input IN2 of control computer 52 is connected to a vehicle speed sensor 66 via signal path 68. Vehicle speed sensor 66 is operable to sense vehicle speed and produce a vehicle speed signal corresponding thereto on signal path 68. In one preferred embodiment, vehicle speed sensor 66 is a variable reluctance sensor positioned about propeller shaft, or tailshaft, 60 adjacent to transmission 58, and is operable to produce an analog vehicle speed signal corresponding to rotational speed of tailshaft 60. Accordingly, input IN2 of control computer 52 preferably includes an analog-to-digital (A/D) converter operable to convert the analog vehicle speed signal to a digital signal suitable for processing by control computer 52. Alternatively, vehicle speed sensor 66 may be any other known sensor or sensing system positioned at any suitable location as long as such an alternate sensor is operable to produce an analog or digital signal indicative of vehicle speed.

Output OUT1 of control computer 52 is connected to a known fuel system 74 associated with engine 54 via signal path 76. As is known in the art, control computer 52 is responsive to the throttle signal on signal path 72, as well as other engine/vehicle operating signals, to determine fueling commands and provide corresponding fueling signals to fuel system 74 via signal path 76. Control computer 52 is accordingly operable to control engine output torque, and consequently engine speed, via appropriate fueling commands.

Control computer 52 further includes an input/output port I/O that is connectable to a known service/recalibration tool 104 via signal path 106. Service/recalibration tool 104 is operable to interface with control computer 52 via signal path 106 to thereby extract operational data therefrom as well as provide programming data thereto as is known in the art. Alternatively, service/recalibration tool 104 may be configured for connection to signal path 84, whereby tool 104 may be operable to interface with control computer 52 and/or transmission control computer 86 to thereby extract operational data therefrom as well as provide programming data thereto as is known in the art.

Figure 4:
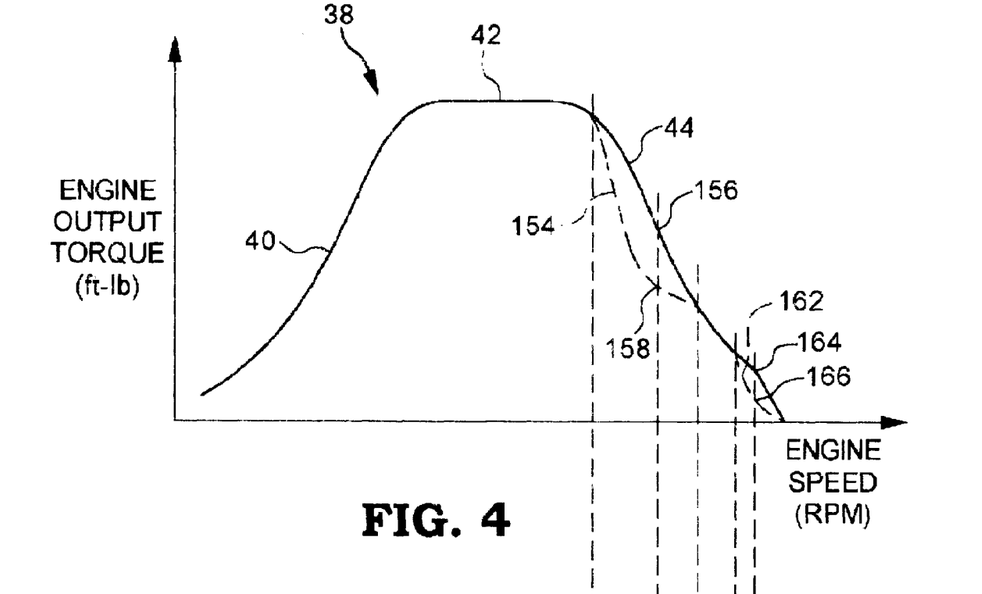
FIG. 4 is a plot of engine output torque vs. engine speed illustrating concepts of the present invention for controlling engine output torque characteristics with the system of FIG. 3.
Figure 5:
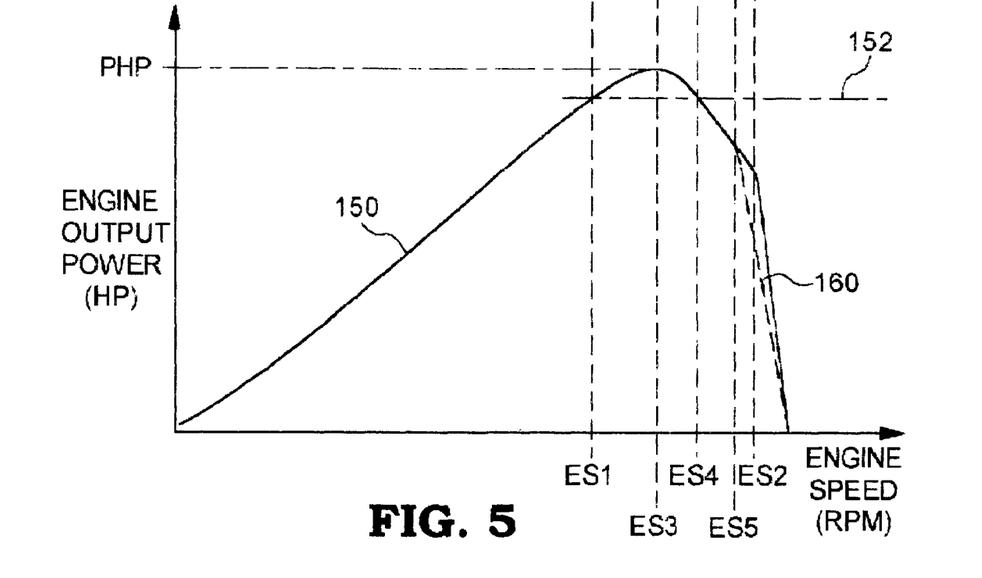
FIG. 5 is a plot of engine output power vs. engine speed illustrating a control strategy of the present invention for controlling engine output torque characteristics as illustrated in FIG. 4 for the system of FIG. 3.

Referring now to FIGS. 4 and 5, the operation of system 50 of FIG. 3 in controlling the output torque characteristics of engine 52, in accordance with a number of preferred control strategies of the present invention, will be described in detail. FIG. 4 includes a plot of the engine output torque curve 38 of FIG. 2 and FIG. 5 illustrates one example of an engine output power curve 150 corresponding to engine output torque curve 38. Engine output torque curve 38 includes region 40 of rising engine output torque followed by region 42 of peak engine output torque followed by region 44 of decreasing engine output torque as described with respect to FIG. 2. Region 44 is defined between engine speed ES1, corresponding to the highest engine speed at which peak engine output torque occurs, and engine speed ES2, corresponding to rated speed as this term is defined hereinabove. Within this region a third engine speed ES3 is defined wherein ES3 corresponds to an engine speed at which the engine reaches its so-called "turbine stall speed" at which a corresponding "stall turbine torque limit" is typically specified as described hereinabove, and where the engine output power curve 150 reaches a peak horsepower value (PHP).

As described in the BACKGROUND section, the engine output torque curve 38 may, on one hand, satisfy all performance, efficiency, emissions and other design criteria while, on the other hand, exhibit an engine output torque value 156 at or around engine speed ES3 that exceeds a given transmission's specified stall turbine torque limit. Rather than redesigning the engine output torque curve 38 to exhibit an acceptable stall turbine torque limit, wherein such a redesign may compromise other engine and/or vehicle performance goals in engine output torque regions remote from region 44, system 50 of FIG. 3 is operable, in accordance with one aspect of the present invention, to alter the engine output torque curve 38 only in region 44 by suitably limiting engine output power in an engine speed vicinity of PHP to thereby limit the stall turbine torque value to an acceptable torque level 158 that is at or below the specified stall turbine torque limit during torque converter mode of operation of torque converter 56. When torque converter 56 is operating in lockup mode, by contrast, system 50 is preferably operable to provide for the default engine output torque curve 38 (i.e., that shown in FIG. 2).

In accordance with one control strategy of the present invention, the engine output power curve 150 is limited between engine speeds ES1 and ES4 to a constant horsepower value 152 during torque converter mode of operation of torque converter 56. This horsepower limit 152 has the result of decreasing the maximum available engine output torque between engine speeds ES1 and ES4 during torque converter mode by replacing a portion of the engine output torque curve 44 corresponding thereto with a reduced output torque portion 154, wherein output torque portion 154 exhibits a maximum engine output torque value 158 at engine speed ES3 that is less than or equal to a desired stall turbine torque limit. This control strategy, while effectively limiting engine output torque at engine speeds for which the stall turbine torque limit is specified, does not substantially disrupt the designed engine output torque characteristics along the torque dwell (region 42) and increasing torque (region 40) portions of torque curve 38. An engine designer may thus, in accordance with the present invention, configure the engine output torque curve 38 so as to limit engine output torque over only a portion of engine output torque region 44 to thereby satisfy an imposed stall turbine torque limit while non-disruptively maintaining desired characteristics of torque curve 38 within regions 40 and 42. In accordance with the present invention, as described hereinabove, horsepower limit 152 is preferably imposed only during the torque converter mode of operation of torque converter 56, while no horsepower limit (i.e., default engine output torque and power) is imposed during the lockup mode of operation of torque converter 56.

It is to be understood that while the embodiment illustrated in FIG. 5 imposes a constant-valued horsepower limit 152 at engine speeds between ES1 and ES4, the present invention contemplates other embodiments of the present invention wherein any horsepower function may be specified between ES1 and ES4 to thereby suitably alter a corresponding portion of engine output torque curve region 44. For example, system 50 may be configured to impose on engine output power curve 150 any discrete, continuous or piecewise continuous function between engine speeds ES1 and ES4 in accordance with one or more equations, tables, charts or graphs, wherein any such equations, tables, charts or graphs are preferably stored in memory 55 of control computer 52. Any such function may be an increasing function, a constant-valued function, a decreasing function and/or any combination thereof, of engine speed and/or other engine/vehicle operating parameters.

In accordance with another aspect of the present invention, system 50 may be configured to further, or only, alter the engine output power curve 150 at or around engine speed ES2 to thereby alter the engine output torque curve 38 at or around rated engine output torque and resultantly control a so-called "speed ratio at governed engine speed." The engine output torque curve 38 may, on one hand, satisfy all performance, efficiency, emissions and other design criteria while, on the other hand, exhibit an engine output torque value 164 at or around engine speed ES2 that exceeds a desired speed ratio at governed engine speed limit. Rather than redesigning the engine output torque curve 38 to exhibit an acceptable speed ratio at governed engine speed, wherein such a redesign may compromise other engine and/or vehicle performance goals, system 50 of FIG. 3 is operable, in accordance with the present invention, to alter the engine output power curve 150 around a vicinity of engine speed ES2 to thereby limit the speed ratio at governed engine speed 164 to an acceptable torque level 166 that is at or below a desired speed ratio at governed engine speed during torque converter mode of operation of torque converter 56. When torque converter 56 is operating in lockup mode, by contrast, system 50 is preferably operable to provide for the default engine output torque curve 38 (i.e., that shown in FIG. 2).

In accordance with another control strategy of the present invention, the engine output power curve 150 is limited at engine speeds greater than or equal to ES5 to a linearly decreasing horsepower limit 160. This horsepower limit 160 has the result of decreasing the maximum available engine output torque at engine speeds greater than or equal to ES5 during torque converter mode by replacing a portion of the engine output torque curve 44 corresponding thereto with a reduced output torque portion 162, wherein output torque portion 162 exhibits a maximum engine output torque value 164 at engine speed ES2 that is less than or equal to a desired speed ratio at governed engine speed. This control strategy, while effectively limiting engine output torque at an engine speed at which the speed ratio at governed engine speed is specified, does not substantially disrupt the designed engine output torque characteristics along other areas of the torque curve 38. An engine designer may thus, in accordance with the present invention, configure the engine output torque curve 38 so as to limit engine output torque over only a portion of engine output torque region 44 to thereby satisfy a desired speed ratio at governed engine speed while non-disruptively maintaining desired characteristics of torque curve 38 along the remaining areas of the torque curve 38.

Those skilled in the art will recognize that the engine output power limit region 160 may alternatively be made to increase for engine speeds greater than or equal to engine speed ES5 to thereby suitably increase the speed ratio at governed engine speed. The engine output power limit region 160 may alternatively be any constant, increasing or decreasing function, or combination thereof, of engine speed and/or other engine/vehicle operating parameters.

In accordance with yet another aspect of the present invention, another specific example, system 50 may be configured to vary an imposed engine output torque limit, or engine output power limit, for engine speed values greater than or equal to ES1, or between ES1 and ES4, as a function of a torque ratio of the torque converter to thereby limit engine output torque in region 44 in accordance with a dynamic torque ratio of torque converter 56 and a predefined turbine torque limit, wherein the dynamic torque ratio of torque converter 56 is a function of the current rotational speed of torque converter impeller 20 and the current rotational speed of torque converter turbine 24 (i.e., torque converter speed ratio). Typically, the torque ratio of torque converter 56 increases with a decreasing speed ratio of torque converter 56 and system 50 may accordingly be provided with one or more turbine torque limit values, or a continuum of turbine torque limit values, whereby system 50 is operable to impose a horsepower limit on engine output power curve 150, or alternatively impose an engine output torque limit on engine output torque curve 38, at engine speeds greater than or equal to ES1, or between ES1 and ES4, as a function of the one or more turbine torque limit values.

In accordance with yet another control strategy of the present invention, system 50 is operable to determine one or more turbine torque limit values and to determine a dynamic torque ratio as a function of torque converter speed ratio, and suitably alter the engine output power curve 150 or engine output torque curve 38 as a function of the torque ratio of torque converter 56 and the one or more turbine torque limit values, to thereby limit engine output torque to a desired torque limit value. Torque converter speed ratio is typically determined as a ratio of torque converter input speed; i.e., rotational speed of impeller 20, and torque converter output speed; i.e., rotational speed of turbine 24, and a corresponding torque converter torque ratio is determined as a function of torque converter speed ratio in accordance with known or experimentally determined torque converter operational behavior. The engine output torque limit value (or engine output power limit value) is then preferably determined as a function of torque converter torque ratio and the one or more turbine torque limit values, whereby system 50 is operable to control engine output torque (or engine output power) as a function of the engine output torque limit value (or engine output power limit value). In one preferred embodiment, system 50 preferably includes a map, table or function relating torque converter speed ratio to torque converter torque ratio stored within memory 55 of control computer 52, whereby control computer 52 is operable to determine a current torque converter torque ratio as a function of current torque converter speed ratio. Torque converter speed ratio is, in one embodiment, determined by system 50 as a ratio of current engine speed (provided by engine speed sensor 62) and transmission input speed (provided by sensor 108). Alternatively, the torque converter speed ratio may be determined as a ratio of current engine speed, or impeller speed if torque converter 56 includes a suitable sensor for sensing rotational speed of impeller 20, and the product of current vehicle speed (provided by tailshaft sensor 66) and currently engaged gear ratio, wherein currently engaged gear ratio is preferably determined by transmission control computer 86 as described hereinabove. Those skilled in the art will recognize that other known techniques may be used for determining a dynamic speed ratio of torque converter 56, the primary importance of any such technique lying in its ability to calculate or estimate a ratio of the rotational speed of impeller 20 and turbine 24. In any case, the one or more turbine torque limit values are preferably stored in memory 55 of control computer 52, whereby system 50 is operable to determine a maximum engine output torque value (or maximum engine output power value) as a function of the current torque converter torque ratio and the one or more turbine torque limit values, and appropriately limit the engine output torque curve 38 (or engine output power curve 150) at engine speeds greater than or equal to ES1, or between engine speeds ES1 and ES4, as a function thereof to thereby dynamically limit engine output torque in region 44 when operating in torque converter mode. In lockup mode, the default engine output torque curve is preferably used.

Figure 6:
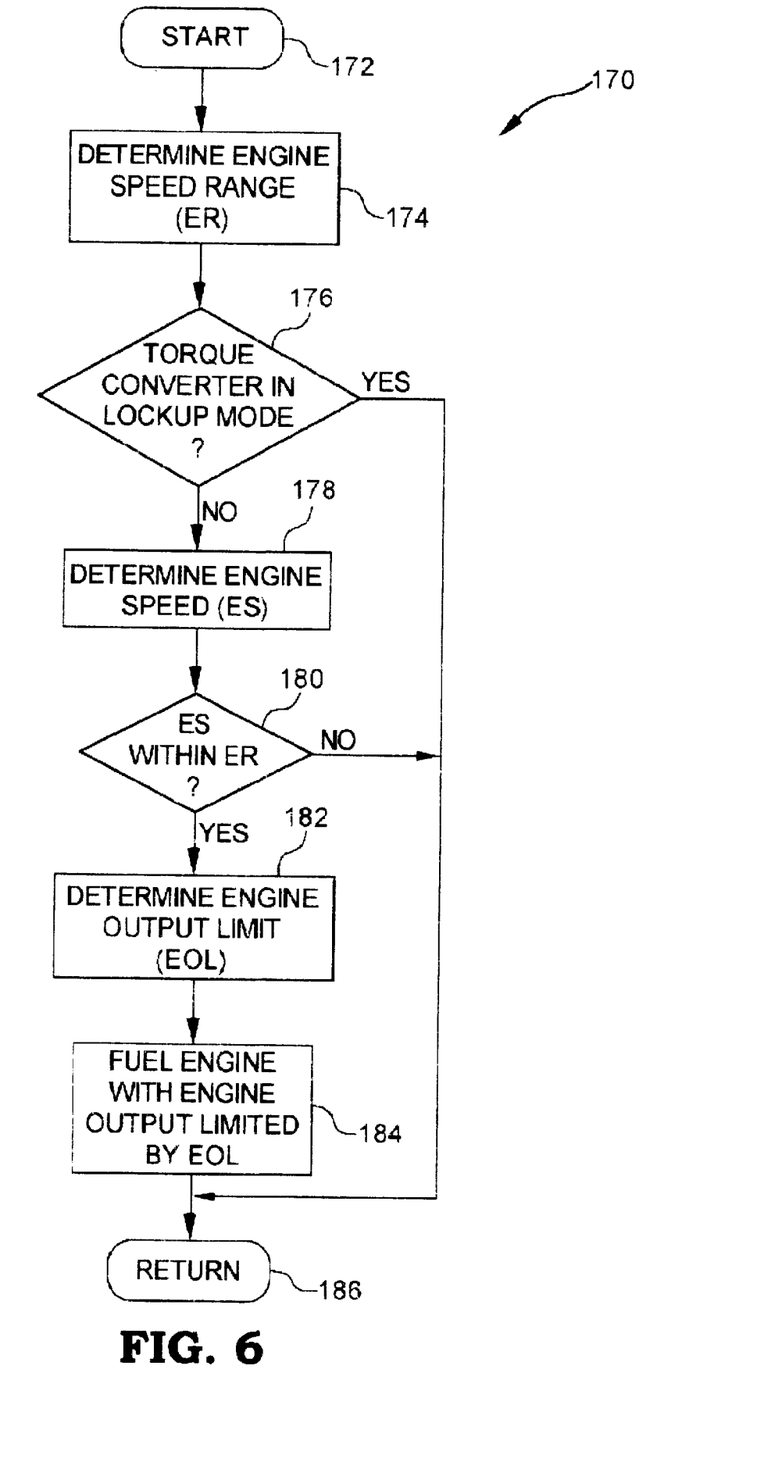
FIG. 6 is a flowchart illustrating one preferred embodiment of a software algorithm, executable by the system of FIG. 3, for carrying out a control strategy of the present invention for controlling engine output torque characteristics.

Referring now to FIG. 6, a flowchart is shown illustrating one preferred embodiment of a software algorithm 170 for controlling engine output torque in accordance with the present invention. Algorithm 170 is preferably stored in memory 55 and executed by control computer 52, although the present invention contemplates that algorithm 170 may alternatively be stored elsewhere and executed by transmission control computer 86, whereby control computer 52 is operable to share operational information with transmission control computer 86 as described hereinabove. Although algorithm 170 may be executed by either computer 52 or computer 86, the operational details of algorithm 170 will be described hereafter as being executed by control computer 52.

Algorithm 170 begins at step 172 and at step 174, control computer 52 is operable to determine an engine speed range (ER) wherein it is desirable to control engine output torque characteristics in accordance with the present invention. For example, the engine speed range (ER) may be all engine speeds greater than or equal to ES1, any engine speed between ES1 and ES4, or all engine speeds greater than ES5, wherein these example engine speed ranges correspond to engine speed ranges of particular interest in the present invention. It is to be understood, however, that the present invention contemplates controlling engine output torque in accordance with the concepts described herein in engine speed ranges other than those just given by example, and the engine speed range variable ER may thus take on other any such engine speed range values. Moreover, it is to be understood that the present invention contemplates determining any number of engine speed ranges ER at step 174, wherein control computer 52 may be subsequently operable to control engine output torque characteristics, in accordance with the present invention, within each of the number of engine speed ranges ER. As one example, it may be desirable to control engine output torque between engine speeds ES1 and ES4 to thereby meet stall turbine torque requirements, as described hereinabove, and to also control engine output torque at engine speeds greater than or equal to ES5 to thereby meet speed ratio at governed engine speed requirements, also as described hereinabove. Those skilled in the art will recognize other desirable engine speed range combinations, and that all such combinations are intended to fall within the scope of the present invention.

In one embodiment, the engine speed range ER is programmable and may thus be stored within memory 55 of control computer 52 (alternatively a memory unit of transmission control computer 86) via service/recalibration tool 104 prior to vehicle operation. In this case, control computer 52 is operable at step 174 to simply recall ER from memory 55. In one specific embodiment, for example, control computer 52 is operable at step 174 to recall from memory 55 a single ER value that corresponds to a particular engine speed range of interest (e.g., between engine speeds ES1 and ES4). In an alternate embodiment, control computer 52 is operable at step 174 to recall from memory 55 any number of engine speed ranges.

Algorithm execution continues from step 174 at step 176 where algorithm 170 begins a loop that is preferably executed with each execution of a fuel control loop. In any case, however, control computer 52 is operable at step 176 to determine an operational mode of the torque converter 56; i.e., whether the torque converter is operating in lockup mode or in torque converter mode, as these operational modes have been defined hereinabove. In one embodiment, control computer 52 is preferably operable at step 176 to determine the operational status of torque converter 56 by determining a ratio of the rotational speed of impeller 20 and the rotational speed of turbine 24, and determine that torque converter 56 is operating in lockup mode if the ratio is within a predefined range of values, and determining that torque converter 56 is operating in torque converter mode if this ratio is outside the predefined range of values. For example, control computer 52 may be operable at step 176 to determine a current engine rotational speed from information provided by engine speed sensor 62 or a current impeller speed from information provided by a sensor for sensing rotational speed of impeller 20 (not shown), determine a current rotational speed of turbine shaft 26 from information provided by turbine shaft speed sensor 108, determine a ratio thereof, and compare this ratio to a predefined range of values. Alternatively, control computer 52 may be operable at step 176 to determine the rotational speed of turbine shaft 26 by first determining rotational speed of tailshaft 18 via information provided by vehicle speed sensor 66, determine a currently engaged gear ratio according to any one or more of the techniques described hereinabove with respect to FIG. 3, and compute the rotational speed of turbine shaft 26 as a product thereof. In any event, control computer 52 is operable at step 176, in this embodiment, to determine that torque converter 56 is operating in lockup mode if the ratio of impeller speed to turbine speed is within a predefined range of values and otherwise determining that torque converter 56 is operating in torque converter mode.

In embodiments wherein transmission 58 includes a transmission control computer 86, control computer 52 is preferably operable at step 176 to determine the operational status of torque converter 56 by monitoring the data link 84 for messages broadcast by transmission control computer 86 relating to the operational status of torque converter 56. In this embodiment, transmission control computer 86 may be operable to determine the operational mode of torque converter 56 according to any of the techniques described hereinabove according to any other known technique, and broadcast the current torque converter operational mode over data link 84.

In an alternative embodiment, the torque converter 56 may include a fluid pressure sensor 100 operable to sense pressure of the fluid supplied by charge pump 30 to torque converter 56 via fluid passage 32 as shown in phantom in FIG. 3 and as described hereinabove. If transmission 58 does not include a transmission control computer 86, control computer 52 is preferably operable at step 176 to determine a pressure of fluid supplied by charge pump 30 via a corresponding pressure signal on signal path 102, and determine therefrom an operational status of torque converter 56. For example, if the fluid pressure detected by sensor 100 is above a first predefined threshold, the lockup clutch 28 is assumed to be engaged and the torque converter 56 is accordingly assumed to be operating in lockup mode. If, however, the fluid pressure detected by sensor 100 is below a second predefined threshold, the lockup clutch 28 is assumed to be disengaged and the torque converter is accordingly assumed to be operating in torque converter mode. The first and second predefined thresholds may be equal, or the second threshold may be less than the first to provide for hysteresis in the pressure switch point. In any case, pressure sensor 100 may alternatively be replaced by a pressure switch having a switch point at or near the first and second predefined pressure thresholds. If, on the other hand, transmission 58 includes a transmission control computer 86, transmission control computer 86 may determine the pressure of fluid supplied by charge pump 30 via a corresponding pressure signal on signal path 102, and either determine a torque converter operational status therefrom and provide such status information to control computer 52 via data link 84 or provide the pressure signal to control computer 52 for subsequent determination of a torque converter operational status. In any case, if, at step 176, the torque converter 56 is operating in lockup mode, algorithm execution continues at step 186.

If, at step 176, the torque converter 56 is not operating in lockup mode but is instead operating in torque converter mode, algorithm execution continues at step 178 where control computer 52 is operable to determine a current engine speed value ES, preferably by monitoring engine speed sensor 62. Thereafter at step 180, control computer 52 is operable to compare the current engine speed value ES with the engine speed range value ER to determine whether the current engine speed value ES is within the engine speed range value ER. If, at step 180, control computer 52 determines that ES is not within ER, algorithm execution continues at step 186.

If, on the other hand, control computer 52 determines at step 180 that ES is within ER, algorithm execution continues at step 182 where control computer 52 is operable to determine an engine output limit (EOL). The engine output limit EOL may, in accordance with the present invention, be an engine output power limit or an engine output torque limit, and in either case, examples of preferred techniques for determining EOL will be described hereinafter with respect to FIGS. 7 and 8. Algorithm execution continues from step 182 at step 184 wherein control computer 52 is operable to fuel engine 54 in such a manner as to limit engine output (e.g., engine output power or engine output torque) to EOL (i.e., either an engine output power limit or an engine output torque limit, respectively). Algorithm execution continues thereafter at step 186 where execution of algorithm 170 is returned to its calling routine. Alternatively, step 184 as well as the YES branch of step 176 and the NO branch of step 180 may loop back to step 174 for continual execution of algorithm 170.

Figures 7, 8:
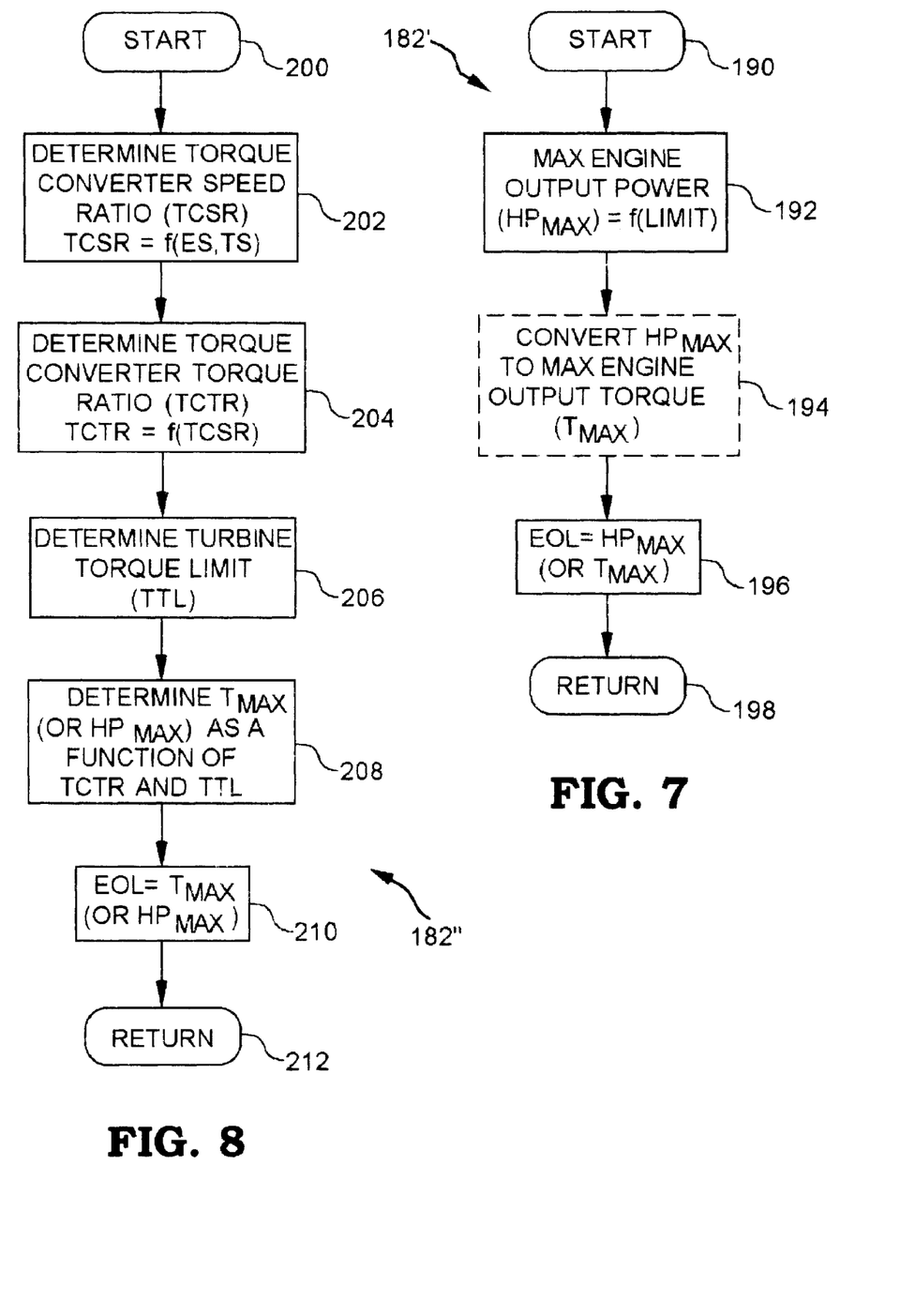
FIG. 7 is a flowchart illustrating one preferred embodiment of a software algorithm, executable by the system of FIG. 3, for carrying out step 182 of the algorithm illustrated in FIG. 6.
FIG. 8 is a flowchart illustrating an alternate embodiment of a software algorithm, executable by the system of FIG. 3, for carrying out step 182 of the algorithm illustrated in FIG. 6.

Referring now to FIG. 7, a flowchart is shown illustrating one preferred embodiment of a software algorithm 182' for executing step 182 of algorithm 170 (FIG. 6), in accordance with the present invention. As with algorithm 170, algorithm 182' will be described as being executable by control computer 52, although it is to be understood that algorithm 182' could alternatively be executed by transmission control computer 86 wherein pertinent information may be shared with control computer 52 via data link 84. In any case, algorithm 182' begins at step 190, and at step 192, control computer 52 is operable to determine a maximum engine output power ($HP_{MAX}$) as a function of some predefined horsepower limit. For example, as illustrated by dashed-line 152 in FIG. 5, $HP_{MAX}$ could be a constant limit between engine speeds ES1 and ES4 that is less than peak horsepower (PHP), wherein the $HP_{MAX}$ value is stored within memory 55 and retrieved therefrom at step 192 by control computer 52. As another example, as illustrated by the dashed-line 160 in FIG. 5, $HP_{MAx}$ could be a linearly or otherwise decreasing function of engine speed for engine speeds greater than ES5. As described hereinabove with reference to FIGS. 4 and 5, it should be understood that $HP_{MAX}$ could alternatively be determined in accordance with any constant, increasing or decreasing function, or combination thereof, for any one or more engine speed ranges, wherein the actual $HP_{MAX}$ value may be stored in memory 55 as a table, graph, equation or the like.

Algorithm 182' may optionally include a step 194, as shown in phantom in FIG. 7, that follows step 192 wherein control computer 52 is operable to convert the $HP_{MAX}$ value to a maximum engine output torque value $T_{MAX}$ in a known manner. Those skilled in the art will recognize that step 184 of algorithm 170 may be more easily executed from a practical standpoint if the engine output limit EOL is in terms of engine output torque rather than engine output power, and optional step 194 is included in algorithm 194 for this reason. Algorithm 182' continues from step 194, or from step 192 if step 194 is omitted, at step 196 wherein control computer is operable to set the variable EOL (used in algorithm 170 of FIG. 6) equal to $HP_{MAX}$ (or $T_{MAX}$ if step 194 is included). Algorithm 182' is thereafter returned, at step 198, to step 182 of algorithm 170.

Referring now to FIG. 8, a flowchart is shown illustrating an alternate embodiment of a software algorithm 182" for executing step 182 of algorithm 170 (FIG. 6), in accordance with the present invention. As with algorithms 170 and 182', algorithm 182" will be described as being executable by control computer 52, although it is to be understood that algorithm 182" could alternatively be executed by transmission control computer 86 wherein pertinent information may be shared with control computer 52 via data link 84. In any case, algorithm 182" begins at step 200, and at step 202, control computer 52 is operable to determine a current torque converter speed ratio (TCSR), preferably as a ratio of torque converter input and output speeds; i.e., as a ratio of the rotational speed of impeller 20 and the rotational speed of turbine 24. In one embodiment, control computer 52 is operable at step 202 to determine TCSR as a ratio of current engine speed (ES), provided by engine speed sensor 62 or impeller speed if torque converter 56 includes a suitable sensor (not shown) for sensing rotational speed of impeller 20, and current turbine speed (TS), provided by turbine speed sensor 108. Alternatively, control computer 52 may be operable at step 202 to determine TCSR as a ratio of current engine speed and the product of tailshaft speed, provided by vehicle speed sensor 66, and currently engaged gear ratio, wherein currently engaged gear ratio may be determined in accordance with one or more of the techniques described hereinabove. Those skilled in the art will recognize that the speed ratio of torque converter 56 may be determined in accordance with a number of known techniques, wherein any such technique is intended to fall within the scope of the present invention. It will be further recognized that the primary importance of any such technique lies in its ability to determine or estimate the ratio of impeller speed and turbine speed.

In any case, algorithm execution continues from step 202 at step 204 where control computer 52 is operable to determine a torque converter torque ratio, preferably as a function of the torque converter speed ratio determined in step 202. In general, however, torque converter torque ratio is a function of torque converter speed ratio and a so-called K-factor ($K_f$), wherein $K_f$ is typically determined experimentally as a ratio of engine speed and the square root of torque transmitted through the torque converter 56, as is known in the art. Thus, at step 204, control computer 52 may alternatively be operable to determine the torque converter torque ratio as a function of current engine speed and $K_f$, wherein $K_f$ must first be determined or estimated as a function of torque converter speed ratio. In any case, algorithm execution continues from step 204 at step 206 where control computer 52 is operable to determine one or more turbine torque limits (TTL). TTL is typically specified by transmission manufacturers, as described hereinabove, and is preferably stored in memory 55. Control computer 52 is accordingly preferably operable at step 206 to determine TTL by retrieving this value from memory 55.

Thereafter at step 208, control computer 52 is operable to determine a maximum engine output torque $T_{MAX}$ (or a maximum engine output power $HP_{MAX}$) as a function of TCTR and TTL to thereby dynamically limit engine output torque in region 44 (FIG. 4) to a maximum engine output torque when operating in torque converter mode. For example, as illustrated by dashed-line 154 in FIG. 4, control computer 52 may determine a maximum engine output parameter; e.g., maximum engine output torque (or maximum engine output power) as a function of $T_{MAX}$ (or $HP_{MAX}$) to thereby achieve stall turbine torque requirements about engine speed ES3 as described hereinabove. As another example, as illustrated by dashed-line 162 in FIG. 4, control computer 52 may determine such a maximum engine output parameter as a function of $T_{MAX}$ (or $HP_{MAX}$) to thereby achieve speed ratio at governed engine speed requirements about engine speed ES2 as described hereinabove.

In any case, algorithm execution continues from step 208 at step 210 where control computer 52 is operable to set the variable EOL (used in algorithm 170 of FIG. 6) equal to $T_{MAX}$ (or $HP_{MAX}$) as described with respect to step 196 of FIG. 7. Algorithm 182" is thereafter returned, at step 212, to step 182 of algorithm 170.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected. For example, while the concepts of the present invention have been described as being particularly concerned with modifying the region 44 of torque curve 38 at various engine speeds above ES1; i.e., at engine speeds greater than engine speeds that define the torque dwell region 42, those skilled in the art will recognize that engine output torque curve 38 may, in some instances, be configured such that the torque dwell region 42 extends to engine speeds just below rated engine speed ES2. In other words, region 44 of the engine output torque curve 38 may be configured to have a very steep slope, in which case peak horsepower (PHP), and accordingly stall turbine torque, occurs within the torque dwell region 42. In such cases, those skilled in the art will recognize that the concepts of the present invention may be employed to Limit engine output torque in the torque dwell region 42 to address stall turbine torque requirements as described hereinabove, and that such engine control falls within the scope of the present invention.

What is claimed is:

1. A system for controlling output torque characteristics of an internal combustion engine, comprising:

a torque converter coupled at one end to an internal combustion engine and at an opposite end to a transmission, said torque converter operating in a lockup mode when said torque converter couples said engine directly to said transmission and otherwise operating in a torque converter mode;

means for producing a first signal indicative of whether said torque converter is operating in said lockup mode or in said torque converter mode; and a control computer responsive to said first signal to limit an engine output parameter to a maximum engine output parameter value within a predefined engine speed range if said first signal indicates that said torque converter is operating in said torque converter mode.

2. The system of claim 1 further including means for determining a rotational speed of said engine and producing an engine speed signal corresponding thereto;

and wherein said control computer is operable to limit said engine output parameter to said maximum engine output parameter value when first signal indicates that said torque converter is operating in said torque converter mode only if said engine speed signal indicates that said engine is operating at an engine speed within said predefined engine speed range.

3. The system of claim 1 wherein said engine output parameter corresponds to engine output power and said maximum engine output parameter value corresponds a maximum horsepower limit.

4. The system of claim 3 further including a memory in communication with said control computer;

and wherein said maximum horsepower limit is stored in said memory.

5. The system of claim 4 wherein said maximum horsepower limit stored in said memory is a function of engine speed within said predefined engine speed range.

6. The system of claim 4 wherein said maximum horsepower limit stored in said memory is a constant maximum horsepower value within said predefined engine speed range.

7. The system of claim 3 wherein said maximum horsepower limit is a function of a torque ratio of said torque converter and a predefined turbine torque limit.

8. The system of claim 7 wherein said torque ratio of said torque converter is a function of a speed ratio of said torque converter.

9. The system of claim 8 further including:

means for determining a rotational speed of said engine and producing an engine speed signal corresponding thereto; and means for determining a rotational speed of a turbine shaft of said torque converter;

and wherein said speed ratio of said torque converter is a function of a current value of said engine speed signal and said rotational speed of said turbine shaft.

10. The system of claim 1 wherein said engine output parameter corresponds to engine output torque and said maximum engine output parameter value corresponds to a maximum engine output torque limit.

11. The system of claim 10 further including:
a memory having a maximum horsepower limit stored therein; and
means for determining a rotational speed of said engine and producing an engine speed signal corresponding thereto;
and wherein said control computer is operable to retrieve said maximum horsepower limit from said memory if said engine speed signal indicates an engine speed value within said predefined engine speed range and said first signal indicates that said torque converter is operating in said torque converter mode, said control computer thereafter converting said maximum horsepower limit to said maximum engine output torque limit.

12. The system of claim 11 wherein said maximum horsepower limit is a function of engine speed within said predefined engine speed range.

13. The system of claim 11 wherein said maximum horsepower limit is a constant maximum horsepower value within said predefined engine speed range.

14. The system of claim 10 wherein said control computer is operable to determine a maximum horsepower limit is a function of a torque ratio of said torque converter and a predefined turbine torque limit, said control computer thereafter converting said maximum horsepower limit to said maximum engine output torque limit.

15. The system of claim 14 wherein said torque ratio of said torque converter is a function of a speed ratio of said torque converter.

16. The system of claim 8 further including:
means for determining a rotational speed of said engine and producing an engine speed signal corresponding thereto; and
means for determining a rotational speed of a turbine shaft of said torque converter;
and wherein said speed ratio of said torque converter is a function of a current value of said engine speed signal and said rotational speed of said turbine shaft.

17. The system of claim 10 wherein said control computer is operable to determine said maximum engine output torque limit as a function of a torque ratio of said torque converter and a predefined turbine torque limit.

18. The system of claim 17 wherein said torque ratio of said torque converter is a function of a speed ratio of said torque converter.

19. The system of claim 18 further including:
means for determining a rotational speed of said engine and producing an engine speed signal corresponding thereto; and
means for determining a rotational speed of a turbine shaft of said torque converter;
and wherein said speed ratio of said torque converter is a function of a current value of said engine speed signal and a said rotational speed of said turbine shaft.

20. The system of claim 1 further including a fuel system responsive to a fueling signal to supply fuel to said engine;
and wherein said control computer is operable to limit said engine output parameter to said maximum engine output parameter value by controlling said fueling signal to thereby correspondingly limit fuel supplied to said engine.

21. The system of claim 1 wherein said means for producing a first signal indicative of whether said torque converter is operating in said lockup mode or in said torque converter mode includes means for determining a rotational speed of an impeller of said torque converter and means for determining a rotational speed of a turbine of said torque converter, said torque converter operating in said lockup mode if a ratio of said rotational speed of said impeller and said rotational speed of said turbine is within a predefined range of values, said torque converter otherwise operating in said torque converter mode.

22. The system of claim 1 wherein said torque converter includes a lockup clutch coupled to said transmission via a fluid passageway, said transmission supplying fluid to said lockup clutch above a first pressure threshold to thereby engage said lockup clutch and below a second pressure threshold to thereby disengage said lockup clutch, said torque converter operable in said lockup mode when said lockup clutch is engaged and in said torque converter mode when said lockup clutch is disengaged.

23. The system of claim 22 wherein said means for producing a first signal indicative of whether said torque converter is operating in said lockup mode or in said torque converter mode includes means for determining a pressure of said fluid supplied by said transmission to said lockup clutch and producing a pressure signal corresponding thereto, said torque converter operating in said lockup mode if said pressure signal indicates a fluid pressure above said first pressure threshold, said torque converter operating in said torque converter mode if said pressure signal indicates a fluid pressure below said second pressure threshold.

24. A method of controlling output characteristics of an internal combustion engine comprising the steps of:
determining an engine speed range of the internal combustion engine;
determining whether a torque converter disposed between the internal combustion engine and a transmission is operating in one of a lockup mode and a torque converter mode;
determining a current engine speed of the engine; and
limiting an engine output parameter to a maximum engine output parameter value if said current engine speed falls within said engine speed range and the torque converter is operating in said torque converter mode.

25. The method of claim 24 wherein the step of determining whether a torque converter disposed between the internal combustion engine and a transmission is operating in one of a lockup mode and a torque converter mode includes the steps of:
determining a rotational speed of an impeller of the torque converter determining a rotational speed of a turbine of the torque converter; and
determining that the torque converter is operating in said lockup mode if a ratio of said rotational speed of the impeller to said rotational speed of the turbine is within a predefined range of values, the torque converter otherwise operating in said torque converter mode.

26. The method of claim 24 wherein the step of determining whether a torque converter disposed between the internal combustion engine and a transmission is operating in one of a lockup mode and a torque converter mode includes the steps of:
determining an operational status of a lockup clutch associated with the torque converter; and
determining that the torque converter is operating in said lockup mode if said operational status of the lockup clutch indicates that the lockup clutch is engaged, the torque converter otherwise operating in said torque converter mode.

27. The method of claim 24 wherein said engine output parameter is engine output power and said maximum engine output parameter value is a maximum engine output power.

28. The method of claim 24 wherein said engine output parameter is engine output torque and said maximum engine output parameter value is a maximum engine output torque.

29. The method of claim 24 wherein said maximum engine output parameter value is a constant engine output power value within said engine speed range.

30. The method of claim 24 wherein said maximum engine output parameter value is a maximum engine output power value as a function of least engine speed within said engine speed range.

31. The method of claim 24 wherein said maximum engine output parameter value is a function of a torque ratio of the torque converter.

32. The method of claim 31 wherein said torque ratio of the torque converter is a function of a speed ratio of the torque converter and a predefined turbine torque limit.

33. The method of claim 32 wherein said speed ratio of the torque converter is a function of a rotational speed of said engine and a rotational speed of a turbine of said torque converter.

* * * * *